United States Patent
Brungardt et al.

(10) Patent No.: US 6,206,259 B1
(45) Date of Patent: *Mar. 27, 2001

(54) HITCH MOUNTABLE BICYCLE CARRIER

(75) Inventors: Kervin Brungardt, Plymouth; Michael J. Cousino, Wayne; David A. Watch, Canton, all of MI (US)

(73) Assignee: Draw-Tite Inc., Canton, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/394,833

(22) Filed: Sep. 13, 1999

Related U.S. Application Data

(63) Continuation of application No. 08/957,884, filed on Oct. 27, 1997, now Pat. No. 5,950,891.
(60) Provisional application No. 60/029,174, filed on Oct. 28, 1996.

(51) Int. Cl.$^7$ .................................................. B60R 9/00
(52) U.S. Cl. ..................... 224/497; 229/502; 229/503; 229/506; 229/924
(58) Field of Search .................... 224/497, 502, 224/503, 506, 509, 924; 211/5, 17, 18

(56) References Cited

U.S. PATENT DOCUMENTS

| | | |
|---|---|---|
| D. 369,585 | 5/1996 | Gregory . |
| 3,877,622 | 4/1975 | McLain . |
| 4,072,257 | 2/1978 | Hall . |
| 4,676,413 | 6/1987 | Began et al. . |
| 4,676,414 | 6/1987 | Deguevara . |
| 5,190,195 | 3/1993 | Fullhart et al. . |
| 5,303,857 | 4/1994 | Hewson . |
| 5,330,084 | 7/1994 | Peters . |
| 5,443,189 | 8/1995 | Hirschfeld . |
| 5,449,101 | 9/1995 | Van Dusen . |
| 5,489,110 | 2/1996 | Van Dusen . |
| 5,529,231 | 6/1996 | Burgess . |
| 5,662,256 * | 9/1997 | Bryan .................................. 224/523 |
| 5,695,103 * | 12/1997 | Duvernay et al. ................... 224/532 |

OTHER PUBLICATIONS

Hitch Ski Carrier Instructions, 1993.
Draw–Tite Catalog, 1995.
Reese Catalog, 1996.

* cited by examiner

*Primary Examiner*—Allan N. Shoap
*Assistant Examiner*—Maerena W. Brevard
(74) *Attorney, Agent, or Firm*—Leon E. Redman; Lloyd D. Doigan

(57) ABSTRACT

A bicycle rack adapted to be detachably mounted to a vehicle via a standard trailer hitch receiver with the bicycle rack having a vertical support pivotally connected at its lower end to a base assembly with a bicycle carrier assembly connected to the upper end of the vertical support. The bicycle carrier assembly includes two generally rectangular plates detachably connected together adapted to receive the crossbars of bicycles. A pin releasably locks the vertical support in an upright position. Upon removal of the pin the vertical support pivots rearwardly away from the vehicle. Tail lights are mounted on the carrier assembly.

17 Claims, 4 Drawing Sheets

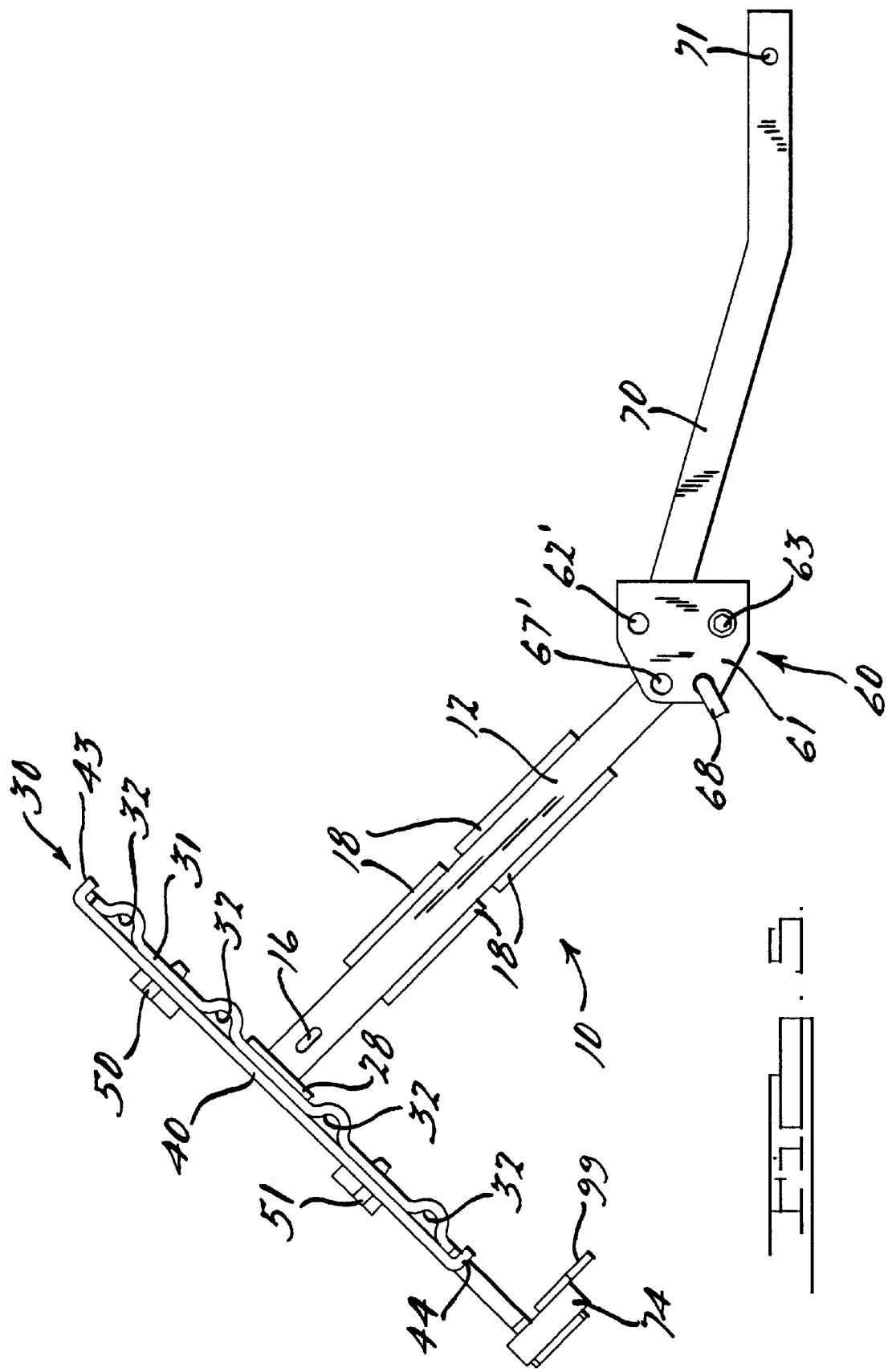

HITCH MOUNTABLE BICYCLE CARRIER

RELATED APPLICATIONS

This application is a continuation of Ser. No. 08/957,884 Oct. 27, 1997 U.S. Pat. No. 5,950,891. This application claim benefit to Provisional application No. 60/029,174 Oct. 28, 1996.

This application claims priority from U.S. Provisional Application No. 60/029,174 filed on Oct. 28, 1996.

FIELD OF THE INVENTION

The present invention relates to a bicycle rack detachably mounted by a base assembly to a vehicle such as a passenger automobile via a standard trailer hitch such as a hitch receiver.

BACKGROUND OF THE INVENTION

Bicycle racks for attachment to passenger vehicle bumpers are well known. Bicycle racks which may be detachably secured to a conventional trailer hitch mounted on a passenger vehicle have recently been introduced. Such bicycle racks typically employ a rectangular base tube that is received in the trailer hitch square tube hitch receiver mounted on a passenger vehicle. A T-shaped bar is secured to and extends upwardly from the base tube. A pair of hook rods are mounted on the top of the T-bar to carry the crossbar of one or more bicycles. Various clamping devices have been used in the prior art to attempt to secure the crossbar of the bicycles to the hook rods extending outwardly from the T-bar. Such clamping devices have various drawbacks. Some lack the necessary structural integrity to securely hold bicycles onto the carrier while being transported by the vehicle. Others are costly to manufacture. Other clamping devices are cumbersome to use. Others lack durability.

One such bicycle rack is disclosed in U.S. Pat. No. 4,676,414. It employs an L-shaped clamping member that has a vertical portion telescopically received within a tubular slide member secured to the back of the T-bar. This type of clamping device is costly to manufacture. It is also cumbersome to use in that it requires the L-shaped clamp member to be lifted vertically and held in a vertical position while bicycles are loaded or unloaded from the hook rods. With this arrangement, interference between the slidable portion of the L-shaped clamp member and the tubular member at the back of the T-bar exacerbates the cumbersome nature of this arrangement.

Another recently introduced bicycle rack is the bike hitch shown and described in U.S. Ser. No. 384,578 filed Jul. 28, 1989. This bike hitch employs a clamp arm pivotally secured to a U-shaped bracket which is fixedly and permanently mounted to the top of the vertical tube and can accommodate only the standard size frame of racing bicycles. The lower portion of the vertical tube is likewise fixedly secured to a horizontally disposed base tube that supports the bicycle rack in a conventional hitch receiver. Neither the top assembly of this rack nor the base assembly permits the bicycle rack to be folded for compact storage or rotated backward to provide clearance for the rear door or hatch of a passenger vehicle or rack.

It is an object of this invention to provide a bicycle rack which securely and conveniently clamps the cross-bars of bicycle frames.

It is another object of the invention to provide such a rack which may be rotated rearward from the vehicle to permit ready access and clearance for a rear door or hatch of the passenger vehicle.

It is yet another object of the invention to provide such a bicycle rack which may be folded for compact storage.

It is yet another object of the invention to provide such a bicycle rack which includes auxiliary tail lights to allow following drivers to see turn signals and brake lights even if the bicycles block the vehicle's tail lights.

It is still another object of the invention to provide such a bicycle rack which includes a license plate bracket to allow placement of a license plate on the bicycle rack if the license plate on the vehicle is blocked from view by the bicycles.

It is yet another object of the invention to provide such a bicycle rack which may be mounted to a conventional trailer hitch receiver.

Another object of the invention is to provide such a rack which is convenient to use, yet sturdy and durable and cost effective to manufacture.

SUMMARY OF THE INVENTION

These and various other objects of the invention are accomplished by a hitch mountable bicycle rack which employs a carrier assembly comprised of a generally rectangular shaped top cover plate releasably secured to a generally rectangular shaped bottom carrier plate. The bottom carrier plate is provided with four depressions adapted to receive the crossbars of bicycles. The top cover plate is removably secured to the bottom carrier plate by threaded knobs extending through apertures in the top cover plate and corresponding, aligned threaded holes in the bottom carrier plate. The top cover plate has downwardly extending lips at each end which fit over the ends of the bottom carrier plate. A tail light assembly comprised of two tail lights mounted on a tail light bracket is secured to one lip of the top cover plate. A license plate bracket is attached to the rear of one of the tail lights. The carrier assembly is secured to the top of a vertically extending stalk which has the form of a generally rectangular shaped tube. The vertically extending stalk is pivotally supported in its vertical position by a lower base assembly having a pair of spaced apart pivot plates each provided with a first pair of vertically spaced apart apertures corresponding to apertures provided at the lower end of the vertical stalk. A removable locking pin secures the vertically extending stalk in its upright position. The pivot plates are also provided with a pair of vertically spaced pivot holes laterally or horizontally spaced apart from the first pair of apertures. Removable adjustment pins extend through the pivot holes and can be removed to allow the stalk to rotate from its vertical position backward away from the vehicle. The pivot plates are fixedly attached to opposite sides of a shank member adjacent the rear of said member. The front of said shank member is removably attached to a conventional trailer hitch receiver via a pin.

BRIEF DESCRIPTION OF THE DRAWINGS

FIG. 5 is a right side elevational view of the bicycle rack rotated rearwardly away from the vehicle to a second rearward position with the locking pin removed allowing rotation of the vertically extending stalk and carrier assembly rearwardly away from the vehicle; and FIG. 6 is a perspective view of the bicycle rack folded for storage with the top cover plate removed from the bottom carrier plate of the carrier assembly and the vertically extending stalk rotated 270° to lie against the stalk member.

DESCRIPTION OF THE PREFERRED EMBODIMENT

Figure 1:
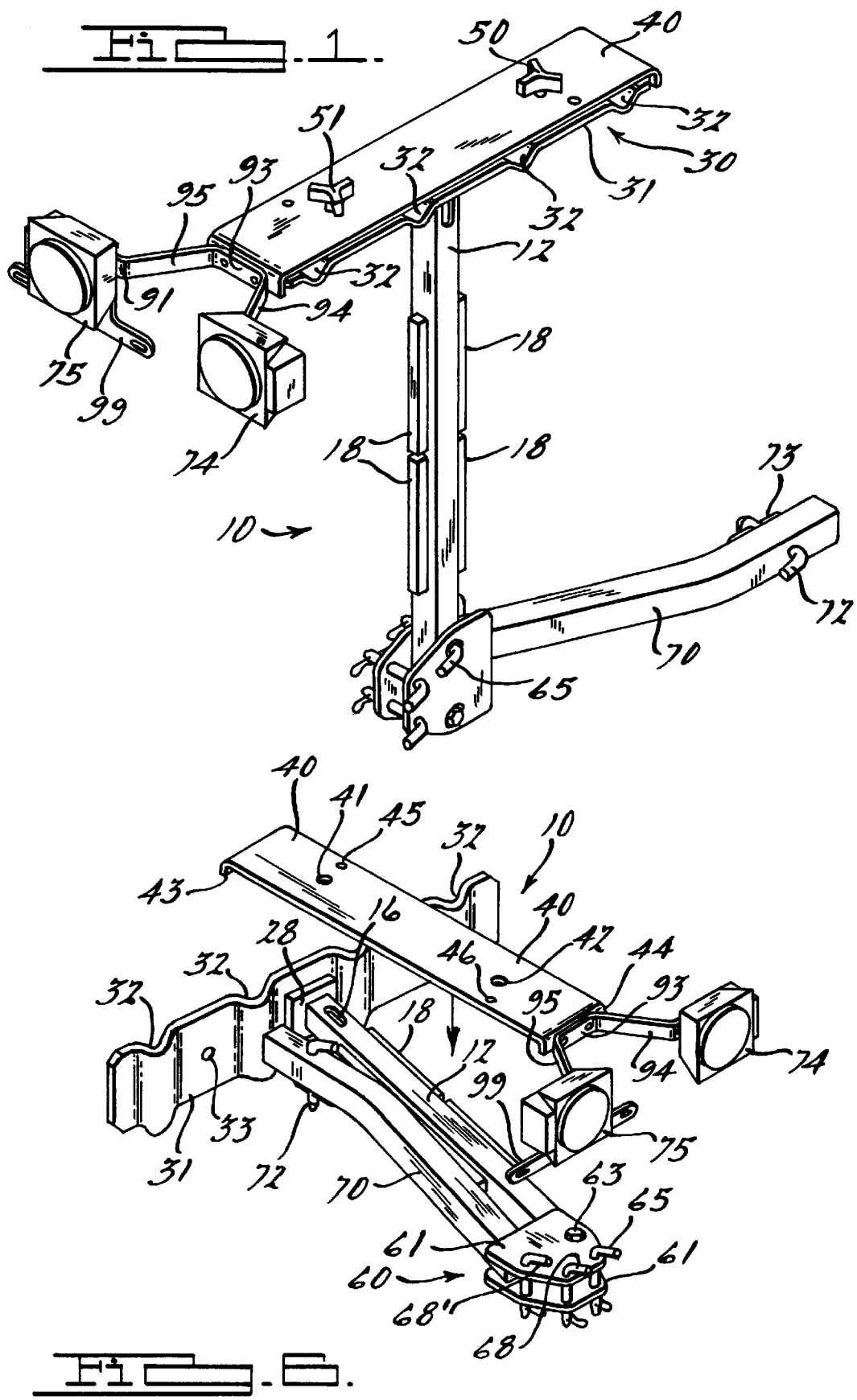
FIG. 1 is a side perspective view of the bicycle rack of the present invention rotated to and releasably locked in its vertically upright position with the top cover plate of the carrier assembly releasably secured to the bottom carrier plate for carrying bicycles for transportation.

Referring to FIGS. 1 through 6, the bicycle rack 10 comprises a vertically extending stalk 12, a generally horizontally disposed carrier assembly 30, and a base assembly 60. The carrier assembly 30 includes a generally rectangular bottom carrier plate 31 and a generally rectangular top cover plate 40. The bottom carrier plate 31 has four longitudinally spaced laterally extending depressions 32 adapted to receive and support the crossbars of bicycles (not shown). It is to be understood that the bottom carrier plate 31 can have less than four depressions, for example, three or two depressions, to carry three or two bicycles.

The top cover plate 40 is removably secured to bottom carrier plate 31 by two threaded knobs 50, 51 extending through longitudinally spaced apart apertures 41, 42 extending through top cover plate 40 and threadedly engaging threaded holes 33, 34 extending through bottom carrier plate 31. Threaded holes 33, 34 are longitudinally spaced apart and aligned with apertures 41, 42. Alternately holes 33, 34 can be unthreaded and threaded knobs 50, 51 can extend through holes 33, 34 and be secured via nuts (not shown). Washers 52, 53 are disposed between the heads of threaded knobs 50, 51 and the top of cover plate 40. The knobs 50, 51 are secured in apertures 41, 42 in top cover plate 40 by push nuts 54, 55.

Top cover plate 40 has downwardly extending lips 43, 44 at opposite ends thereof. Lips 43, 44 fit over the ends 35, 36 of bottom carrier plate 31. These lips make it more difficult to force top cover plate 40 and bottom carrier plate 31 far enough apart to slip the two end bicycles out.

The top cover plate 40 has two additional, longitudinally and laterally spaced apart apertures 45, 46 extending therethrough at opposite corners thereof. Apertures 45, 46 are aligned with apertures 37, 38 extending through bottom carrier plate 31 at opposite corners thereof. Apertures 37, 45 and 38, 46 are adapted to receive padlocks or other locking means to lock the top cover plate 40 to bottom carrier plate 31.

Due to the lips 43, 44 and locking means extending through apertures 37, 45 and 38, 46 a would-be thief would find it extremely difficult to steal the bicycles from the carrier. A thief needs to carry tools and can still only except to get away with a portion of the carrier that ties the bicycles together in an awkward package.

The bottom carrier plate 31 and the top cover plate can be covered with a plastic material, such as for example vinyl, by dipping in such material or by spraying such material thereon to completely pad them. This padding prevents damage to bicycles during loading and transport.

Bicycles, especially four bicycles as can be carried by the instant bicycle carrier, carried behind a vehicle can partially or completely obscure the vehicle's tail lights and license plates. Auxiliary tail lights and a license plate bracket are provided which place all tail light functions and the license plate behind the bicycles so that they may be clearly seen.

Figure 2:
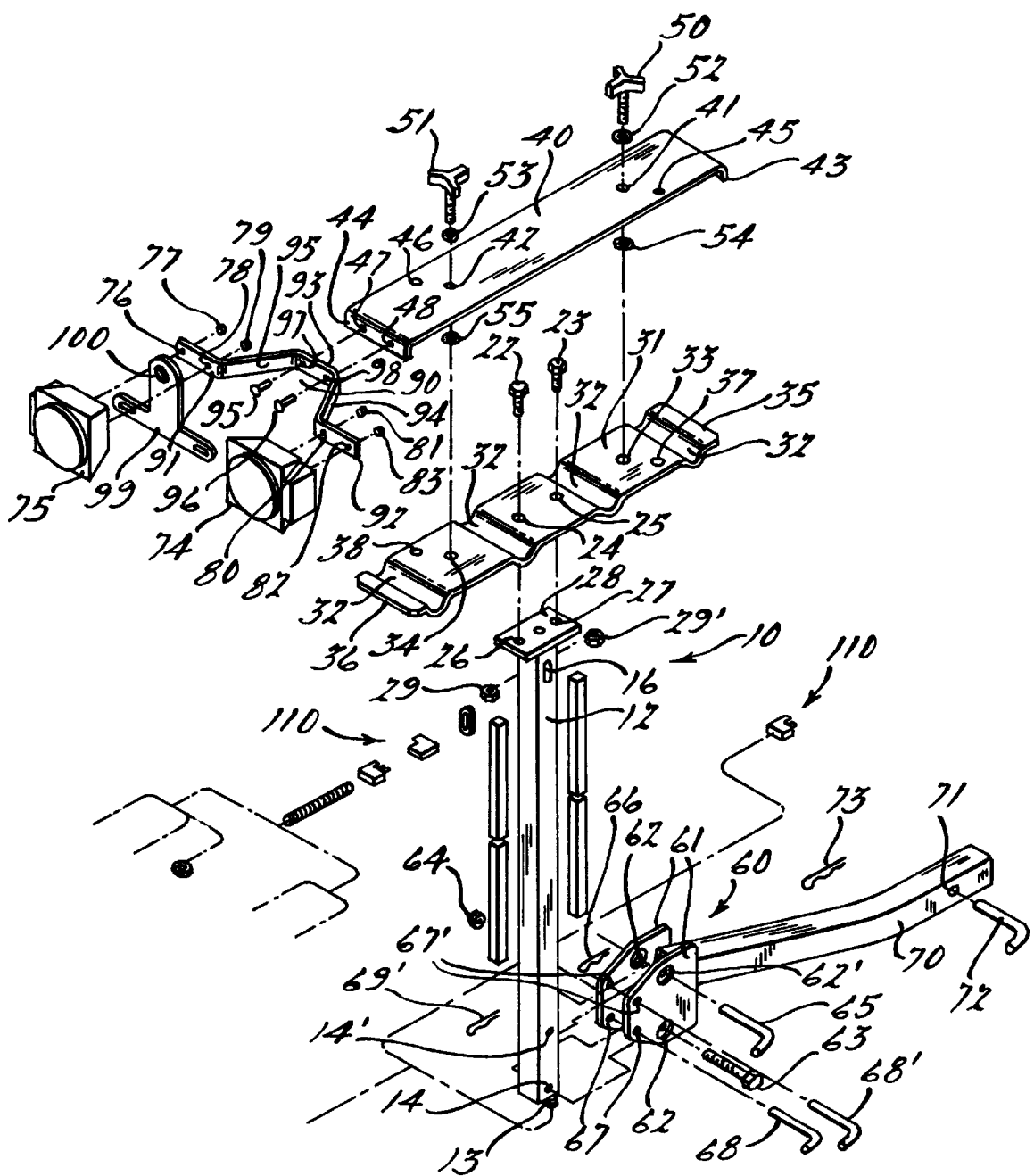
FIG. 2 is an exploded perspective view of the bicycle rack of the present invention.
Figure 3:
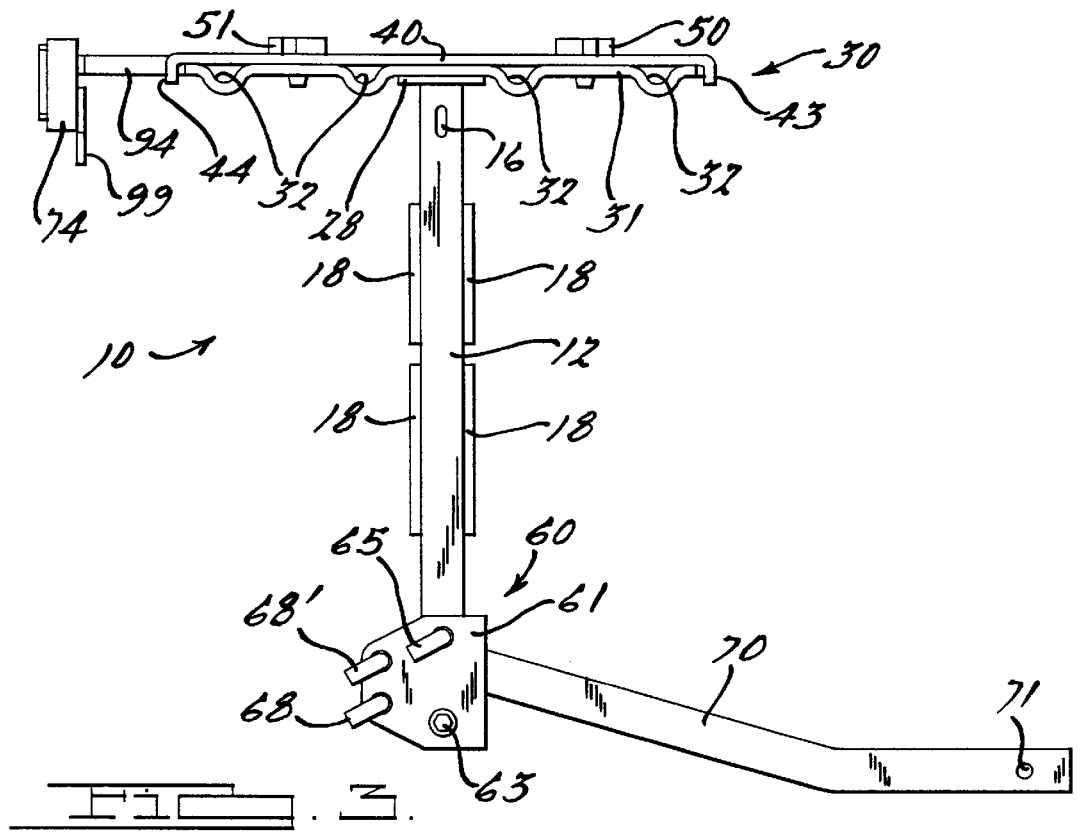
FIG. 3 is a right side elevational view of the bicycle rack rotated to and releasably locked in its vertically upright position with the top cover plate of the carrier assembly releasably secured to the bottom carrier plate for carrying bicycles for transportation.

The auxiliary tail lights 74, 75 can be circular, rectangular, or of any other conventional shape. In the embodiment illustrated in the drawings they are circular. As best illustrated in FIGS. 1, 2 and 6 they are mounted on the top cover plate 40. More specifically lights 74, 75 are mounted on light bracket 90 which in turn is mounted on the lip 44 of top cover plate 40.

Light 75 is secured to laterally extending arm 91 of light bracket 90, while light 74 is secured to laterally extending arm 92 of light bracket 90. Light 75 is secured to laterally extending arm 91 by bolts, studs or the like extending from the rear of light 75 through apertures 76, 78 in arm 91 and lock nuts 77, 79 which are locked into the portions of the bolts or the like extending out beyond apertures 76, 78. Light 74 is secured to laterally extending arm 92 by bolts, studs or the like extending from the rear of light 74 through apertures 80, 82 in arm 92 and lock nuts 81, 83 which are locked onto the portions of the bolts or the like extending out beyond apertures 80, 82. The flat base 93 of the generally V-shaped light bracket 90, which is joined to arm 92 by leg 94 and to arm 91 by leg 95, is secured to lip 44 via bolts, screws, and the like 95, 96 extending through apertures 97, 98 in the base 93 and apertures 47, 48 in lip 44.

The license plate bracket 99 is attached to the back of light 75 via fastening means such as a bolt, screw and the like extending through aperture 100. While in the embodiment illustrated in the drawings license plate bracket 99 is attached to the back of light 75, it is to be understood that license plate bracket 99 may be attached to the back of light 74 instead of to the back of light 75.

The carrier assembly 30 is secured to vertically extending stalk 12 by carriage bolts 22, 23 extending through openings 24, 25 in bottom carrier plate 31 and aligned openings 26, 27 in mounting plate 28 and secured by lock nuts 29, 29'. Plate 28 is fixedly attached, for example by welding, to the top of vertically extending stalk 12.

The bicycle rack 10 is detachably mounted via the base assembly 60 to a conventional trailer hitch receiver (not shown) which may be permanently affixed to the frame of a vehicle. Base assembly 60 includes a pair of pivot plates 61 each fixedly attached, for example by welding, to the sides of shank member 70. Pivot plates 61 are generally flat, parallel to each other and affixed to opposite sides of shank member 70.

Figure 4:
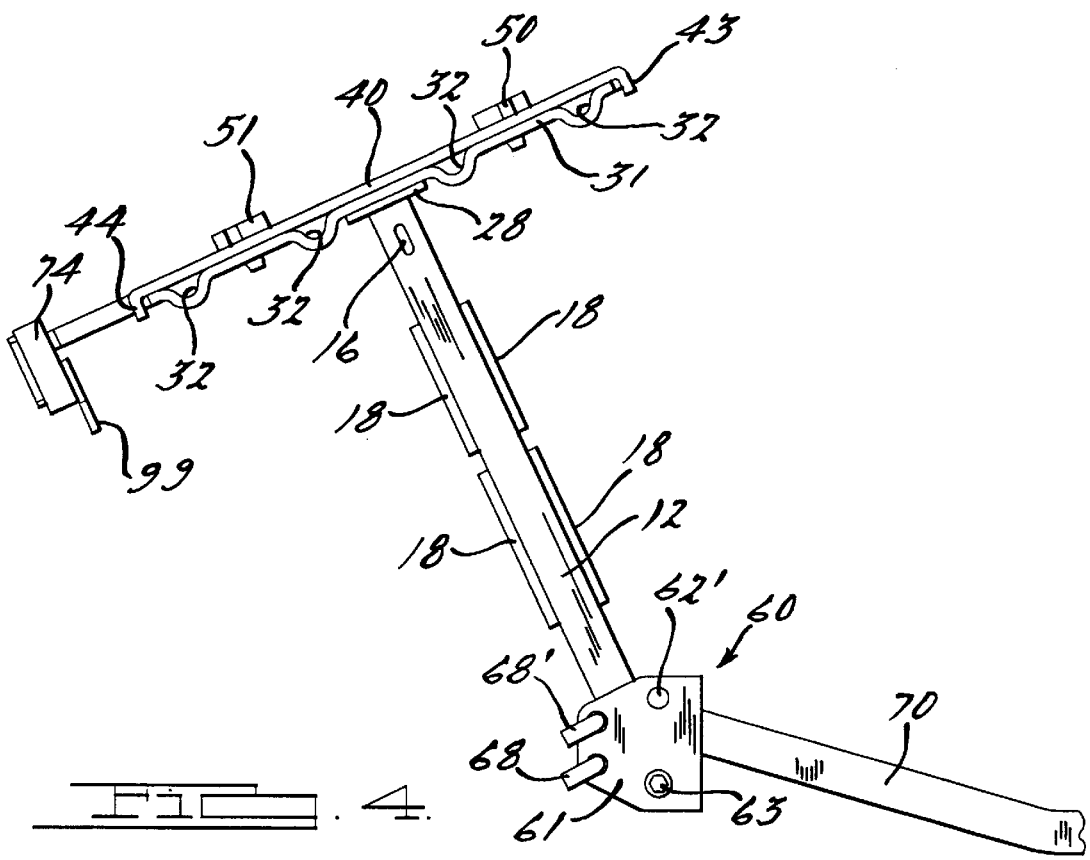
FIG. 4 is a right side elevational view of the bicycle rack rotated rearwardly away from the vehicle to a first rearward position with the locking pin removed allowing rotation of the vertically extending stalk and carrier assembly rearwardly away from the vehicle.

Each of the pivot plates 61 is provided with a first pair of vertically aligned and spaced apart apertures 62, 62' with corresponding apertures 14, 14' provided at the lower end of vertically extending stalk 12. The stalk 12 is thus pivotally mounted for rotation between the pivot plates 61 via lower threaded bolt 63 extending through lower apertures 62 and 14 and nut 64. A locking pin 65 extends through upper aperture 62' of the first pair of apertures 62, 62' in the first pivot plate 61, through upper aperture 14' of the pair of apertures 14, 14' in the stalk 12, and extends out the other upper aperture 62' in the other pivot plate 61 (see FIGS. 1, 2 and 6). Locking pin 65 is secured against removal by clip 66. By removing locking pin 65 from the upper apertures 62' of both pivot plates 61 and aperture 14' in stalk 12. the vertically extending stalk 12 may be rotated in a rearward direction from the vehicle as seen in FIGS. 4 and 5.

Both pivot plates 61 are provided with a pair of vertically aligned and spaced apart tilt adjustment holes, upper tilt adjustment holes 67' and lower tilt adjustment holes 67. An upper adjustment pin 68' extends through upper tilt adjustment holes 67' and is secured therein by clip 69'. A lower adjustment pin 68 extends through lower adjustment holes 67 and is secured therein by clip 69.

With the locking pin 65 removed from upper apertures 62' in pivot plates 61 and upper aperture 14' in stalk 12, and with upper adjustment pin 68' inserted through upper tilt adjustment holes 67' in both pivot plates 61, the stalk 12 can be pivoted or rotated about bolt 63 rearwardly away from the vehicle until it abuts upper adjustment pin 68'. Such a position is illustrated in FIG. 4. In this position the stalk 12 is tilted to the rear and away from the vehicle approximately 30°.

With the upper adjustment pin 68' removed from upper tilt adjustment holes 67' in both pivot plates 61, but with lower adjustment pin 68 inserted through lower tilt adjustment holes 67 in both pivot plates 61, the stalk 12 can be pivoted or rotated about bolt 63 rearwardly away from the vehicle until it abuts lower adjustment pin 68. Such a position is illustrated in FIG. 5. In this position the stalk 12 is tilted to the rear and away from the vehicle approximately 45°.

With both upper adjustment pin 68' and lower adjustment pin 68 removed from the pivot plates 61 the stalk 12 can be tilted to the rear and away from the vehicle approximately 90°; approximately parallel to the ground. In this situation care should be taken that the lights 74 and 75 are not slammed against the ground and broken.

With both upper adjustment pin 68' and lower adjustment pin 68 removed from the pivot plate 61, and the bicycle carrier removed from trailer hitch receiver (not shown) the stalk 12 can be pivoted or rotated 270° to the storage position wherein the stalk 12 abuts and lies against shank member 70 as illustrated in FIG. 6.

The bicycle carrier 10 is attached to the trailer hitch receiver via the shank member 70. More specifically shank member 70 is inserted into the receiver until apertures 71 in shank member 70 are aligned with corresponding apertures in the trailer hitch receiver (not shown). Pin 72 is then inserted through the aligned apertures. Pin 72 is locked in place via clip 73.

The wiring assembly 110 for the tail lights 74, 75 extends from and is connected to the tail light system of the vehicle in the conventional manner. It then extends through the hollow interior of stalk 12, entering stalk 12 at the bottom 13 of stalk 12 and exiting stalk 12 through aperture 16 adjacent the top of stalk 12. The wiring 110 is then connected in a conventional and well known manner to lights 74, 75.

Foam tape strips 18 are adhesively secured to the stalk 12 to protect stalk 12 from being scratched.

Although a preferred embodiment of the hitch mounted bicycle rack of the present invention has been shown and described in detail, it should be noted that variations or modifications may be made without departing from the spirit and scope of the present invention.

What is claimed is:

1. A bicycle rack comprising:
    a lower base assembly including a longitudinally extending shank member being adapted to be removably mounted onto a trailer hitch affixed to a vehicle;
    an upper, horizontal bicycle carrier assembly adapted to carry at least one bicycle disposed in a generally horizontal position comprising a bottom carrier member and a top cover member removably mounted to said bottom carrier member wherein the crossbar of said at least one bicycle is secured between said bottom carrier member and said top cover member when s aid top cover member is mounted in said bottom carrier member;
    a vertical support member having a lower end pivotally mounted on said lower assembly and an upper end attached to said bottom carrier member;
    said lower base assembly including a pair of opposed pivot plate members affixed to opposite sides of said shank member,
    said vertical support member pivotally connected to said pivot plates,
    a releasable locking member releasably locking said vertical support member in a vertical position, said vertical support member pivotable rearwardly from said vehicle upon release of said locking member,
    a plurality of tilt adjustment members for supporting said vertical support member at a plurality of discrete rearwardly pivoted positions to provide varying degrees of clearance between the bicycle rack and the rear of the vehicle, and to allow said vertical support member to pivot approximately 270 degrees to a foldable storage position where it lies against said shank member.

2. The bicycle rack of claim 1 wherein said top cover member and said bottom carrier member comprise generally rectangular shaped plates.

3. The bicycle rack of claim 2 wherein said top cover member has downwardly extending lips at opposite ends thereof adapted to fit over the ends of said bottom carrier member.

4. The bicycle rack of claim 1 wherein at least one of said bottom carrier member and said top cover member has at least one laterally extending depression therein adapted to receive at least part of the crossbar of a bicycle.

5. The bicycle rack of claim 4 wherein said bottom carrier member has said at least one laterally extending depression.

6. The bicycle rack of claim 1 wherein said upper bicycle carrier assembly includes means for removably mounting said top cover member to said bottom carrier member.

7. The bicycle rack of claim 6 wherein said upper bicycle carrier assembly includes means for locking said top cover member to said bottom carrier member.

8. The bicycle rack of claim 1 wherein said bottom carrier member is removably affixed to said vertical support member.

9. The bicycle rack of claim 1 wherein said vertical support member comprises a hollow generally tubular member.

10. The bicycle rack of claim 9 wherein said hollow tubular member has a square or rectangular cross-section.

11. The bicycle rack of claim 1 wherein at least two auxiliary tail lights are mounted on said bicycle rack.

12. The bicycle rack of claim 11 wherein said tail lights are mounted on said upper bicycle carrier assembly.

13. The bicycle rack of claim 12 wherein said tail lights are mounted on said top cover member.

14. The bicycle rack of claim 1 wherein a license plate bracket is mounted on said bicycle rack.

15. A bicycle rack comprising:
    a lower base assembly adapted to be removably mounted onto a trailer hitch affixed to a vehicle;
    an upper, horizontal bicycle carrier assembly adapted to carry at least one bicycle disposed in a generally horizontal position;
    a vertical support member having a lower end mounted on said lower assembly and an upper end attached to said upper carrier assembly;

a bracket mounted on the rear of said upper carrier assembly, said bracket including a central base portion and rearwardly and laterally extending arms on opposite sides of said central base portion; and a tail light mounted on each of said rearwardly and laterally extending arms.

16. A bicycle rack comprising:

a lower base assembly adapted to be removably mounted onto a trailer hitch affixed to a vehicle;

an upper bicycle carrier assembly adapted to carry at least one bicycle, said upper bicycle carrier assembly disposed in a generally horizontal position and comprising a bottom carrier member and a top cover member removably mounted to said bottom carrier member wherein at least one bicycle is secured between said bottom carrier member and said top cover member when said top cover member is mounted to said bottom carrier member;

said top cover member and said bottom carrier member comprising generally rectangular shaped plates;

said top cover member having a downwardly extending lip adapted to fit over one end of said bottom carrier member;

a vertical support member having a lower end pivotally mounted on said lower base assembly and an upper end attached to said bottom carrier member;

a bracket mounted on the rear of said upper carrier assembly, said bracket including a central base portion and rearwardly and laterally extending arms on opposite sides of said central base portion; and a tail light mounted on each of said rearwardly and laterally extending arms.

17. The bicycle rack of claim 16 wherein said central base portion of said bracket is attached to said downwardly extending lip of said top cover member.

\* \* \* \* \*